(12) United States Patent
Katz

(10) Patent No.: US 6,327,575 B1
(45) Date of Patent: Dec. 4, 2001

(54) POINT OF SALE TERMINAL FOR THE VISUALLY IMPAIRED

(76) Inventor: Ronald Craig Katz, 9 Glen Ave., Sea Cliff, NY (US) 11579

( * ) Notice: Subject to any disclaimer, the term of this patent is extended or adjusted under 35 U.S.C. 154(b) by 0 days.

(21) Appl. No.: 09/483,294

(22) Filed: Jan. 14, 2000

Related U.S. Application Data

(60) Provisional application No. 60/131,042, filed on Apr. 26, 1999.

(51) Int. Cl.[7] .................................................. G06F 17/60
(52) U.S. Cl. ............................................ 705/16; 235/7 R
(58) Field of Search .............................. 705/16, 43, 17, 705/21; 235/7 R, 91 PR, 379, 1 E; 379/444, 451, 452, 453, 433, 434, 437

(56) References Cited

U.S. PATENT DOCUMENTS

| | | | |
|---|---|---|---|
| 4,359,631 | * 11/1982 | Lockwood et al. | 235/381 |
| 4,760,245 | * 7/1988 | Fukaya | 235/111 |
| 5,185,515 | 2/1993 | Nishibe . | |
| 5,301,230 | * 4/1994 | Barry | 379/447 |
| 5,353,349 | * 10/1994 | Brown et al. | 379/450 |
| 5,412,189 | 5/1995 | Cragun . | |
| 5,564,486 | * 10/1996 | Deigman | 160/113 |
| 5,589,855 | 12/1996 | Blumstein et al. . | |
| 5,610,382 | * 3/1997 | Yamamoto | 235/379 |
| 5,617,474 | * 4/1997 | Ditzig | 379/433 |
| 5,786,584 | * 7/1998 | Button et al. | 235/462 |
| 6,061,666 | * 5/2000 | Do et al. | 705/43 |

FOREIGN PATENT DOCUMENTS

| | | |
|---|---|---|
| 0720 131 A1 | 3/1996 | (EP) . |
| 10063919 A | * 6/1998 | (JP) . |
| WO 98/27533 | 6/1998 | (WO) . |

OTHER PUBLICATIONS

Pay & Play Talking Cash Register, by Parentbanc. Retreived from the Internet: <http://www.parentbanc.com/products/prod/P_playstore.html> Dec. 1998.*

Law & Vanderheiden, Accessibility of Information/Transaction Machines (ITMs): Results of a Research Project by the Trace R&D Center for the US Access Board, www.dinf.org/tide98/124/law vanderheiden.html, Oct. 14, 1999.

Accessible Point–of–Sale (POS) Device Trace Center Prototype, www.tracecenter.org/world/kiosks/itms/prototypes-.pos.html, Oct. 14, 1999.

* cited by examiner

Primary Examiner—Robert P. Olszewski
Assistant Examiner—Andrew J. Fischer
(74) Attorney, Agent, or Firm—Vernon C. Maine; Scott J. Asmus

(57) ABSTRACT

A merchant's point of sale terminal system for processing credit and debit card and other electronic purchases for a vision impaired purchaser, incorporating a removable or auxiliary handset with a manual keypad disposed on an arched surface between siderails, the keypad being a ten data key array in the familiar three by three over one pattern but displaced from any function keys. The system is further equipped and configured to provide an automated, contemporaneous, audio call out of at least the monetary total of the transaction being processed.

10 Claims, 4 Drawing Sheets

POINT OF SALE TERMINAL FOR THE VISUALLY IMPAIRED

This application claims priority to pending U.S. application Ser. No. 60/131,042, filed Apr. 26, 1999 by the same applicant.

BACKGROUND OF THE INVENTION

1. Technical Field of the Invention

This invention most generally relates to merchant operated, manual entry and magnetic card swipe point of sale terminals for entry of purchase information and for swiping and keying of purchaser's credit card numbers and personal identification numbers; and in particular to point of sale terminals adapted for the particular requirements of visually impaired purchasers.

2. Background Art

The art of point of sale terminals has previously been generally constrained by the assumption that merchants are the primary operators, and that keyed entries are verifiable by the information displayed or printed out on a receipt slip. While the credit card or debit card number can be swiped or be assumed to be correctly entered by the merchant, the consumer's PIN (personal identification number), typically associated with a debit card, is expected to be manually keyed by the consumer in order to maintain its secrecy.

Referring to FIG. 1, a typical point of sale terminal of the prior art is illustrated, with the common features: power connection 1, telephone connection 2, keypad 3 consisting of numeric and special function keys, magnetic card swipe 4, alpha/numeric display 5, and receipt printer 6. As illustrated, the device is connected to power and by telephone line to the financial services network of which the host merchant is a subscriber.

The card swipe mechanism provides for entering account numbers and other information that may be embedded in the magnetic strip on the purchaser's credit or debit card. The keys of the keypad have customized symbols or legends in addition to the usual telephone style numeric layout, which guide the host merchant in conducting the special operations and sequences required by the terminal or the network to which it is connected. The special operations and sequences are required in order to execute a transaction and to do the periodic settlement activities. The visual electronic display and the printed receipt may or may not be augmented by a beep or similar other non-intelligent audio feedback signal indicating a completed or failed sequential step.

It will be readily apparent that vision impaired debit card users often can not or have difficulty with manual entry of their PIN on conventional point of sale terminals, and must resort to disclosing their PIN to the merchant or a third party for manual entry, thus compromising the security of their bank accounts.

Furthermore, where the information on the transaction total is limited to an electronic display and a printed receipt, the vision impaired consumer is totally dependent on the accuracy and integrity of the merchant to have charged the correct transaction amount to their credit or debit card. Without the immediate opportunity to compare the dollar amount being recorded at the time of the sale, it will be unlikely or impossible for the vision impaired consumer to detect errors later, and difficult at best to correct them after the fact.

In summary, with the use of conventional point of sale terminals, the vision impaired consumer is clearly vulnerable to compromises of the security of their bank accounts when they give out their PINs to facilitate a debit card transaction, and to errors or intentional misconduct in recorded credit and debit card transaction amounts, where at least the total charge is not immediately verifiable by the consumer.

In other categories of electronic equipment design such as ATMs (Automatic Teller Machines), organizations representing the interests of blind and vision impaired persons, such as Associated Services for the Blind, Cincinnati Association for the Blind, Jewish Braille Institute of America, Lighthouse for the Blind of Houston, Lighthouse for the Blind (St Louis), Vermont Association for the Blind and Visually Impaired, Visions Services for the Blind and Visually Impaired, American Foundation for the Blind, Braille Institute of America, The Chicago Lighthouse for People who Are Blind or Visually Impaired, Pennsylvania Association for the Blind, American Foundation for the Blind, Helen Keller Services for the Blind, Connecticut Institute for the Blind, Center for the Visually Impaired, Community Services for the Blind and Partially Sighted, and American Council of the Blind, have promoted the adoption of operating standards such as promulgated by the American National Standards Institute, that facilitate direct use of such equipment by vision impaired consumers. These standards have not previously been recognized as relevant in the context of a merchant's point of sale terminal.

The reader may find the following materials instructive of the general state of art relating to visually impaired user interface with electronic systems, prior to the present invention: *Accessibility of Information/Transaction Machines (ITMs) results of a research project by the Trace R&D Center for the US Access Board*, by Chris M. Law and Gregg C. Vanderheiden, University of Wisconsin-Madison, allegedly posted on the web at www.dinf.org/tide98/124/law vanderheiden.html on Aug. 24, 1998; International patent application WO 98/27533, *Automatic Bank Teller Machine for the Blind and Visually Impaired*, Citicorp Development Center, published Jun. 25, 1998; U.S. Pat. No. 5,185,515, *Automated Teller Machine and Method Thereof*, Kunihiko, published Feb. 9, 1993; U.S. Pat. No. 5,412,189, *Touch Screen Apparatus with Tactile Information*, Cragun, pub'd May 2, 1995; U.S. Pat. No. 5,589,855, *Visually Impaired Customer Activated Terminal Method and System*, Blumstein et at, pub'd Dec. 31, 1996; European patent application no. EP 0 720 131 A1, *A Self-Service Transaction Terminal*, NCR International, Inc., pub'd 03.07.1996; U.S. Pat. No. 5,444,616, *Financial Transaction Systems and Methods Utilizing a Multi-Reader Transaction Terminal*, Parameswaran et al, pub'd Aug. 22, 1995; and U.S. Pat. No. 4,310,885, *Point of Sale Terminal Having Prompting Display and Automatic Money Handling*, Azcua et al, pub'd Jan. 12, 1982.

SUMMARY OF THE INVENTION

The invention, most simply stated, is a merchant's manual entry point of sale terminal system with particular enhancements, for use in a retail setting to facilitate electronic transactions by vision impaired purchasers. The system is connected in the usual manner to the merchant's financial services network. The terminal is typically used by the host merchant or sales clerk for initialization and entry of line items and related data and computation of the transaction total, and by the consumer, particularly vision impaired consumers, for keyed and swiped entry of credit and debit, card and/or account numbers and PIN (personal identification number) data used to transact point of sale consumer purchases. The invention provides both ergonomic features to facilitate the manipulation of the terminal by vision impaired purchasers for card and PIN inputs, and an automated voice call-out of at least the transaction total so that the purchaser and sales clerk have a common audible reference for validation of the transaction total and the purchaser is not totally reliant on the printed receipt.

The manual input interface element of the system is designed and configured as a 10 key set, using the familiar telephone keypad arrangement of the 0–9 digits, of finger-actuated input keys arrayed on an arched, natural hand and finger conforming, keypad surface. The keypad has raised siderails that guide and nestle the hand and inhibit lateral motion over the keypad. The keypad section is portable with respect to the terminal base for presentation to the vision impaired consumer for the consumer's direct manual input of at least its confidential PIN (Personal Identification Number)-type information into the merchant's terminal system. The terminal system incorporates a voice synthesizer and supporting circuitry enabling a callout of at least the transaction total, so that the vision impaired consumer and the sales clerk can verify by common auditory means the transaction total which he or she is being charged.

It is an object of the invention to provide a point of sale terminal that facilitates manual entry of credit and debit card numbers and PIN data by blind and vision impaired card users, with limited likelihood that the merchant or third parties will intercept the PIN data.

It is yet another object of the invention to provide a point of sale terminal that announces at least the total amount of the purchase to both the clerk and the purchaser, so that both can immediately validate the amount of the transaction being recorded.

The invention is distinguished from the prior art by its novel, application specific, combination of features, which provides benefits to the vision impaired consumer population in the form of ease of use, enhanced protection from unnecessary disclosure of PIN information, immediate non-visual validation of transaction total, and reduced risk of inadvertent or intentional transaction errors being discovered after the sale is completed.

Still other objects and advantages of the present invention will become readily apparent to those skilled in this art from the following detailed description, wherein I have shown and described only a preferred embodiment of the invention, simply by way of illustration of the best mode contemplated by me on carrying out my invention.

DESCRIPTION OF THE PREFERRED EMBODIMENT

To those skilled in the art, the invention admits of many variations. An enabling description of the preferred embodiment follows.

Figure 2:
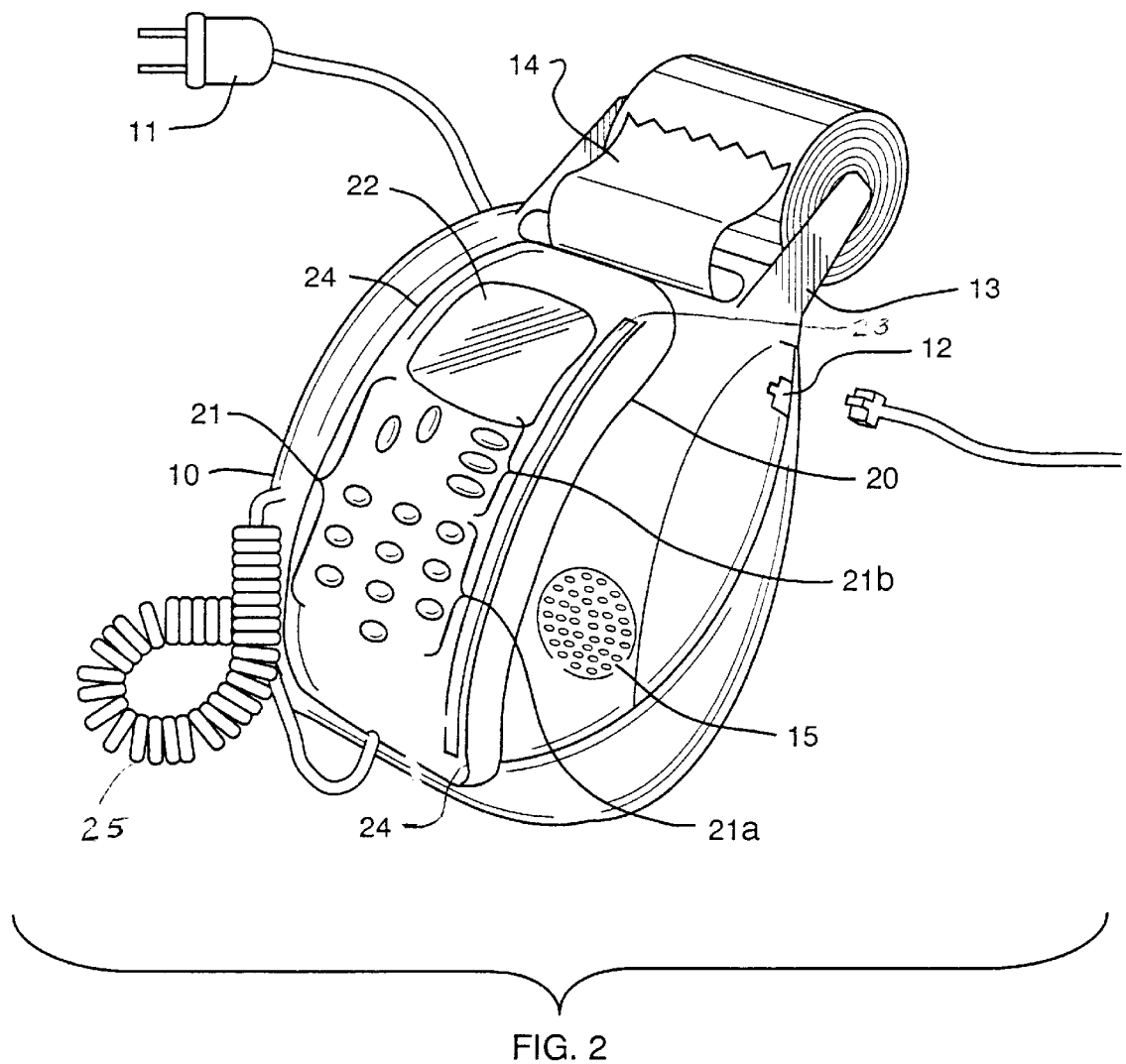
FIG. 2 is a perspective view of a point of sale terminal of the invention, illustrating the salient features of the invention.
Figure 3:
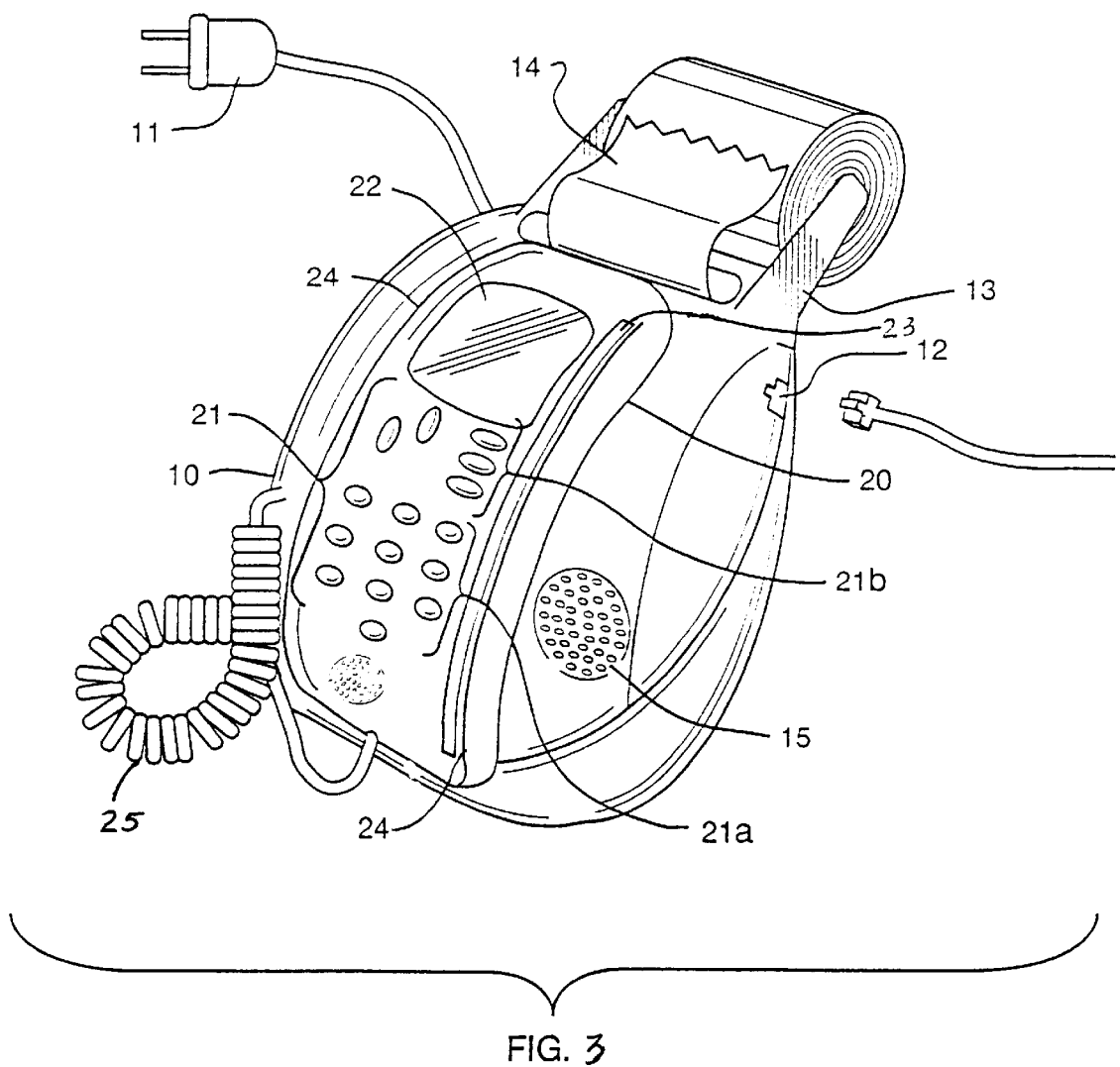
FIG. 3 is a perspective view of a point of sale terminal of a embodiment of present invention illustrating the salient features of the invention, specifically, a speaker mounted on the handset.
Figure 4:
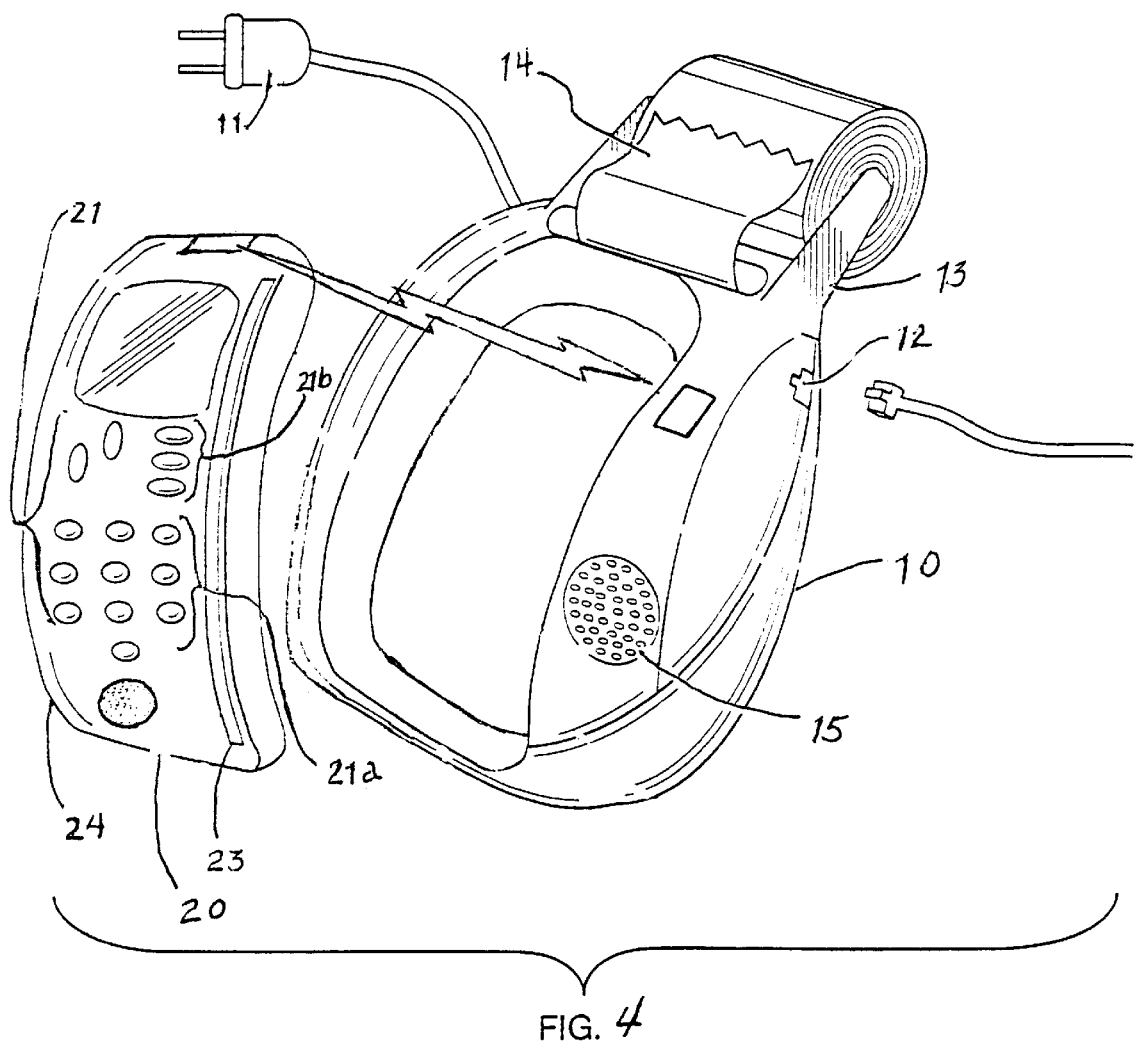
FIG. 4 is a perspective view of a point of sale terminal of yet another embodiment the present invention, illustrating the salient features of the invention, particularly the use of a line of sight wireless transmission device.

Referring to FIG. 2, terminal base 10 of the Point of Sale Terminal has a power connection 11, and a data line connection 12, which may be a simple telephone line or other hardwire, wireless, or fiber-optic data communications link suitable for connecting the terminal to the merchant's financial services vendor network. Receipt printer 14 on base 10 is supplied with paper by paper roll brackets 13. Base 10 also incorporates a speaker 15, which could, of course be remoted from the terminal base so long as it is within hearing range of the users.

Keypad 21, alphanumeric display 22 and card swipe mechanism 23 are incorporated into handset 20, which is connected by coiled cable 25 to the terminal base 10. The data link between the handset and the base could, of course, be wireless such as by infrared transmitters and receivers.

Figure 1:
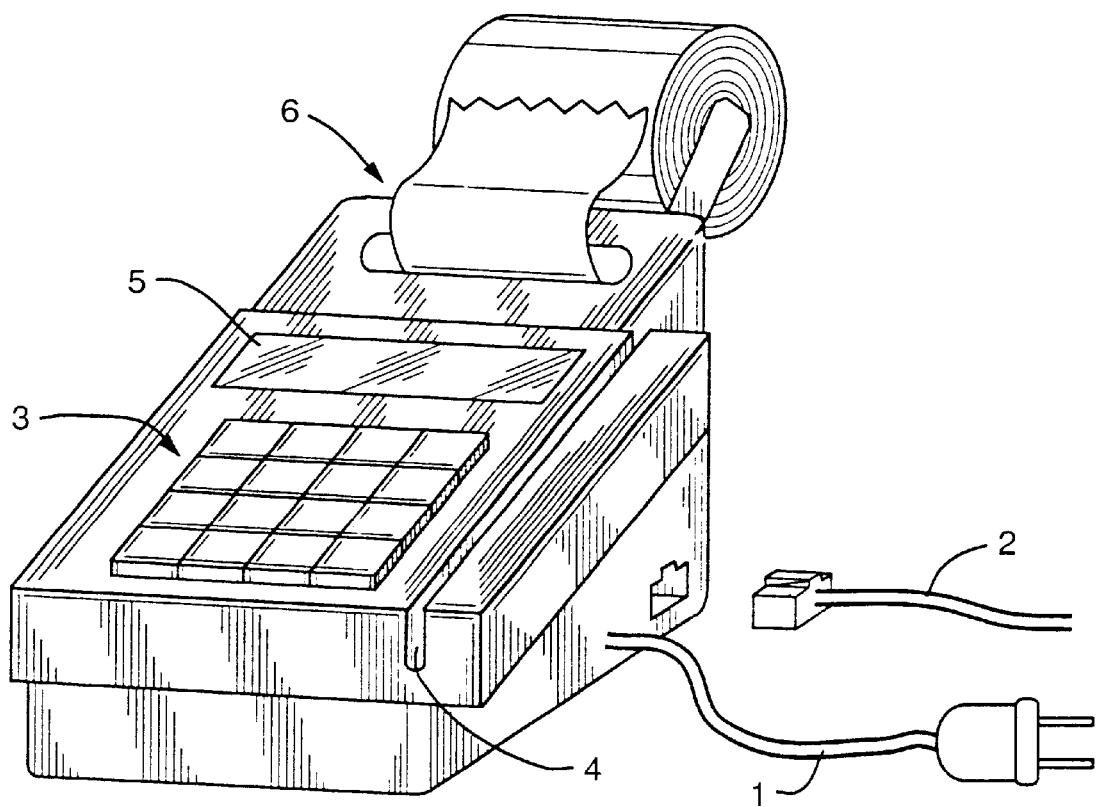
FIG. 1 is a perspective view of a point of sale terminal of the prior art, illustrating the features common to terminals of the prior art.

The keys of keypad 21 of handset 20 are distinguishable from the prior art keypad of FIG. 1 to separate the numeric keys 21A from the function keys 21B, with the numeric keys be arranged in the familiar ten key telephone keypad arrangement, 3×3 plus 1, with a nib on the center key for easy orientation of the user's fingers on the keypad. The surface of the handset, in particular the end where numeric keys 21A are located, is arched to conform naturally to the orientation of the palm and fingers of average users. Keypad 21 is contained on either side by siderails 24. Card swipe mechanism 23 of handset 20 is incorporated into the right side siderail 24, to the right of keypad 21 as is the usual orientation in the prior art.

Handset 20 normally nestles on the front face of base 10 for convenient use by the merchant, but is easily removable, while still connected by the cable for data communication to base 10, for presentation to the consumer for the consumer's direct manual entry of PIN information and/or card swipe when appropriate.

The electronic, alphanumeric display 22 services the merchant and consumers with normal vision capability, as in the prior art. Printer 14 provides the usual printed receipt the same as in the prior art, preferably with larger font type so as to facilitate immediate and post-sale reading of the receipt by the purchaser. The terminal system is further equipped with means for providing an auditory receipt report. Speaker 15 is supported by internal circuitry that automatically decodes the dollar amount of the transaction and provides a voice callout of at least the total dollar amount, after all items have been entered. The voice callout is arranged to be audible to both the purchaser and the sales clerk, and offers the purchaser a contemporaneous opportunity to question the clerk, before leaving the scene. The automated callout can, of course, be further customized with line item cost call outs and/or courtesy messages such as "Thank you for shopping at (Store name)."

The individual features are each implemented with commonly available technology. While none of these individual features poses an inventive burden for those skilled in the arts, it is the combination of these features presented in this system, for this purpose, that is the hallmark of the invention.

As will be realized, the invention is capable of other and different embodiments, and its several details are capable of modifications in various obvious respects, all without departing from the invention. Among the many examples are the following:

A merchant's point of sale terminal for processing electronic purchase transactions for a vision impaired purchaser, consisting of a handset and a base, where the handset is readily attachable to and detachable from the base, and has means for communicating data between the handset and the base. The handset has means for keyed entry of single digits and means for electronically reading the purchaser's account data that is embedded in his or her credit or debit card, or in any other mechanism or medium now existing or later developed, that similarly associates the PIN data exclusively with the identity of the purchaser. The base has means for connecting to line power and to the merchant's financial services network, means for processing electronic purchase transactions, and means for printing the purchase transaction data. The terminal system has the further capability of producing an audible callout of at least the total dollar amount of a purchase transaction.

One embodiment, for the means for communicating data between the handset and the base, uses a coiled cable of signal carrying wires, such as is commonly used between a telephone handset and base. Another embodiment uses a line of sight wireless transmitting and receiving system with compatible transceivers located in the handset and the base.

Yet another embodiment, for the means for keyed entry of single digits, employs a three by three over one array of ten keys, similar to a telephone pad array, arranged and disposed on an arched surface between two raised siderails. The handset may have additional function keys, but they are displaced somewhat from the ten key array, spaced apart so as to avoid confusion to a vision impaired user.

Still yet another embodiment, for the means for electronically reading the purchaser's account data, consists of a magnetic strip card swipe reader integrated into a raised siderail on the handset, adjacent to the keypad.

Of course, many embodiments will employ as means for connecting to a power source, a common AC line cord and two or three conductor connector for plugging into a line power wall outlet.

Many embodiments, as means for connecting to a financial services data network, will use a common, multi-conductor telephone jack connector for accepting connection to a telephone system to which the host merchant's financial services data network is likewise connected. Many other embodiments use a fiber-optic connector for accepting connection to a fiber-optic data communications system to which the host merchant's financial services network is likewise connected. As yet another alternative, many other embodiments use a wireless transmitting and receiving system with compatible transceivers respectively connected to the base and the financial services network.

There are embodiments of the invention that, as means for printing purchase transaction data, use a roll-feed printer incorporated into the base, or are connected to an external printer. The printer may be arranged to print in a larger than normal font, for easier comprehension by purchasers with limited vision.

In all cases, it will be apparent that there is a means for producing an audible callout of at least the total dollar amount of the purchase transaction. This is most typically done with a voice synthesizer and speaker incorporated into the base or the handset, but an external speaker may be utilized in some cases, or any combination of these that insures that the purchaser and the sales clerk are provided at least the basic information by auditory means so that the purchaser has an opportunity to question.

Another embodiment of a merchant's point of sale terminal system for processing electronic purchase transactions for a vision impaired purchaser, has a purchaser's separate or auxiliary handset and a base terminal with the base terminal configured with a keypad suitable for keying host merchant data entries, and means for communicating data between the handset and the base terminal. The system otherwise consists of the same features and variations as above embodiments.

In summary, the invention is distinguished from the prior art by the novel combination of features incorporated into a merchant's point of sale terminal as disclosed herein, providing benefits to the vision impaired consumer population in the form of enhanced PIN security through the use of direct, personal, manual means of data entry, and contemporaneous, automatic, audio reporting by the point of sale terminal system for verification of the transaction amount.

The Applicant expressly denies any claim to or authorship of the overall ornamental shape and design of the preferred embodiment presented in the figures, beyond the limitations expressed in the claims that follow. It will be evident to those skilled in the art that the invention claimed below may be readily packaged in various and other overall shapes and designs, all without departing from the essence of the invention or the scope of the claims.

I claim:

1. A merchant's point of sale terminal for processing electronic purchase transactions for a vision impaired purchaser, comprising:
   a base, said base comprising means for connecting to a power source, means for connecting to a financial services network, means for processing a said electronic purchase transaction, and means for printing purchase transaction data;
   a handset, said handset comprising a three by three over one array of ten keys disposed on an arched surface between two raised siderails, additional function keys displaced from said array of ten keys, a magnetic strip card swipe reader integrated into a said raised siderail for electronically reading purchaser's account data embedded in a magnetic strip card, said handset being readily attachable to and detachable from said base;
   a coiled cable of signal carrying wires for communicating data between said handset and said base; and
   means for producing a callout of at least the total dollar amount of a said purchase transaction, audible to both an operator and said purchaser.

2. The merchant's point of sale terminal of claim 1, said means for connecting to a power source comprising a common AC line cord and connector for plugging into a line power outlet.

3. The merchant's point of sale terminal of claim 2, said means for connecting to a financial services data network comprising a multi-conductor telephone jack connector for accepting connection to a telephone system to which said financial services data network is likewise connected.

4. The merchant's point of sale terminal of claim 2, said means for connecting to a financial services network comprising a fiber-optic connector for accepting connection to a fiber-optic data communications system to which said financial services network is likewise connected.

5. The merchant's point of sale terminal of claim 2, said means for connecting to a financial services network comprising a wireless transmitting and receiving system with compatible transceivers respectively connected to said base and said financial services network.

6. The merchant's point of sale terminal of claim 3, said means for printing purchase transaction data comprising a roll-feed printer incorporated into said base.

7. The merchant's point of sale terminal of claim 3, said means for printing purchase transaction data comprising a printer port connectable to an external printer.

8. The merchant's point of sale terminal of claim 6, said means for producing a callout of at least the total dollar amount of a said purchase transaction comprising a voice synthesizer and speaker incorporated into said base.

9. A merchant's point of sale terminal for processing electronic purchase transactions for a vision impaired purchaser, comprising:

a handset and a base, said handset being readily attachable to and detachable from said base, means for communicating data between said handset and said base, said handset comprising a key pad and means for electronically reading purchaser's account data embedded in a tangible medium, said base comprising means for connecting to a power source, means for connecting to a financial services network, means for processing a said electronic purchase transaction, and means for printing purchase transaction data, and means for producing a callout of at least the total dollar amount of a said purchase transaction, audible to both an operator and said purchaser, said means for communicating data between said handset and said base comprising a coiled cable of signal carrying wires, said keypad comprising a three by three over one array of ten keys disposed on an arched surface between two raised siderails, said keypad further comprising additional function keys displaced from said array of ten keys said means for electronically reading purchaser's account data embedded in a tangible medium comprising a magnetic strip card swipe reader integrated into a said raised siderail, said means for connecting to a financial services data network comprising a multi-conductor telephone jack connector for accepting connection to a telephone system to which said financial services data network is likewise connected, said means for printing purchase transaction data comprising a roll-feed printer incorporated into said base, said means for producing a callout of at least the total dollar amount of a said purchase transaction comprising a voice synthesizer and speaker incorporated into said base.

10. A merchant's point of sale terminal for processing electronic purchase transactions for a vision impaired purchaser, comprising:

a purchaser's handset and a base, said base configured with a keypad suitable for keying host merchant data entries, means for communicating data between said handset and said base, said handset comprising a keypad and means for electronically reading purchaser's account data embedded in a tangible medium, said base comprising means for connecting to a power source, means for connecting to a financial services network, means for processing a said electronic purchase transaction, and means for printing purchase transaction data, and means for producing a callout of at least the total dollar amount of a said purchase transaction, audible to both an operator and said purchaser, said means for communicating data between said handset and said base comprising signal carrying wires, said keypad comprising a three by three over one array of ten keys disposed on an arched surface between two raised siderails, said keypad further comprising additional function keys displaced from said array of ten keys, said means for electronically reading purchaser's account data embedded in a tangible medium comprising a magnetic strip card swipe reader integrated into a said raised siderail, said means for connecting to a financial services data network comprising a multi-conductor telephone jack connector for accepting connection to a telephone system to which said financial services data network is likewise connected, said means for printing purchase transaction data comprising a roll-feed printer incorporated into said base, said means for producing a callout of at least the total dollar amount of a said purchase transaction comprising a voice synthesizer and speaker incorporated into said handset.

\* \* \* \* \*